(12) United States Patent     (10) Patent No.:   US 12,593,108 B2

Bhutani et al.     (45) Date of Patent:   Mar. 31, 2026

(54) SYSTEMS AND METHODS FOR AUTOMATED SPEECH-TO-TEXT CAPTIONING

(71) Applicant: Meta Platforms Technologies, LLC, Menlo Park, CA (US)

(72) Inventors: Aayush Bhutani, Redwood, CA (US); Dipro Ray, Sunnyvale, CA (US)

(73) Assignee: Metal Platforms Technologies, LLC, Menlo Park, CA (US)

( * ) Notice: Subject to any disclaimer, the term of this patent is extended or adjusted under 35 U.S.C. 154(b) by 50 days.

(21) Appl. No.: 18/624,514

(22) Filed: Apr. 2, 2024

(65) Prior Publication Data

US 2025/0310614 A1    Oct. 2, 2025

(51) Int. Cl.
| | |
|---|---|
| *H04N 21/47* | (2011.01) |
| *G10L 15/08* | (2006.01) |
| *G10L 15/26* | (2006.01) |
| *H04N 21/488* | (2011.01) |
| *H04N 21/854* | (2011.01) |

(52) U.S. Cl.
CPC ......... *H04N 21/4884* (2013.01); *G10L 15/08* (2013.01); *G10L 15/26* (2013.01); *H04N 21/854* (2013.01)

(58) Field of Classification Search
CPC .. H04N 21/47; H04N 21/4884; H04N 21/854; G10L 15/08; G10L 15/26
USPC ........ 386/278, 245, 246, 248, 244, 239, 282
See application file for complete search history.

(56) References Cited

U.S. PATENT DOCUMENTS

| | | | |
|---|---|---|---|
| 11,070,891 B1 | 7/2021 | Effinger et al. | |
| 2018/0143956 A1 | 5/2018 | Skarbovsky et al. | |
| 2023/0360635 A1* | 11/2023 | Mostitsky | ............... G10L 15/07 |
| 2025/0080807 A1* | 3/2025 | Xu | ..................... H04N 21/4884 |

OTHER PUBLICATIONS

Extended European Search Report for European Patent Application No. 25159648.2, dated Sep. 2, 2025, 8 pages.

* cited by examiner

*Primary Examiner* — Daquan Zhao
(74) *Attorney, Agent, or Firm* — EVERSHEDS SUTHERLAND (US) LLP

(57) ABSTRACT

The disclosed systems and methods may include (1) generating a caption for a spoken phrase in a video, (2) determining an accuracy rating for the caption, and (3) in response to determining that the accuracy rating is below an accuracy threshold, prompting a user to manually review the caption prior to publishing the caption. Various other methods, systems, and computer-readable media are also disclosed.

16 Claims, 13 Drawing Sheets

100

110
Generate a caption for a spoken phrase in a video

120
Determine an accuracy rating for the caption

130
In response to determining that the accuracy rating is below an accuracy threshold, prompt a user to manually review the caption prior to publishing the caption

SYSTEMS AND METHODS FOR AUTOMATED SPEECH-TO-TEXT CAPTIONING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
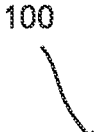
FIG. 1 is a flow diagram of an exemplary method for automated speech-to-text captioning.
Figure 1:
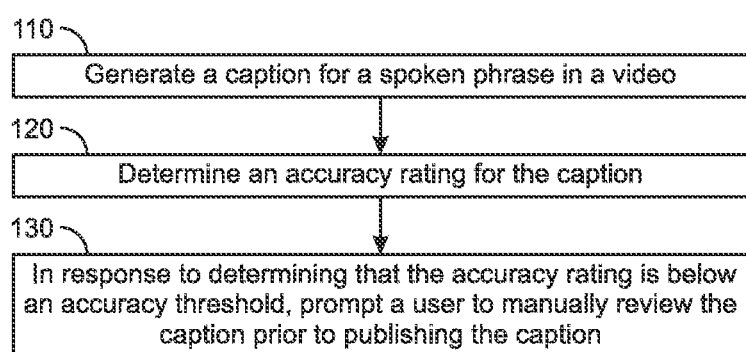

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to an automatic speech-to-text captioning framework (e.g., integrated with a social media platform) for automatically generating captions for video content. Traditional automatic speech-to-text frameworks have problems with accuracy and do not provide users with control over captions (e.g., the ability to edit captions, review captions before downloading, remove captions, etc.). Traditional frameworks also fail in scenarios in which a video has burned-in captions and/or background music.

The disclosed speech-to-text captioning framework may include a variety of features, each of which may solve for one or more of the challenges identified above. In some examples, the framework may (1) automatically generate a caption for speech detected in video content and (2) algorithmically determine whether the caption is a high-accuracy caption or a low-accuracy caption. In some examples, if the caption is designated as a high-accuracy caption, the caption may be published with the video content (e.g., without user review). By contrast, if the caption is designated as a low-accuracy caption, the caption may be provided to a user associated with the video content (e.g., a creator and/or poster of the video content) for manual review prior to publishing.

The high verse low accuracy designation may be determined in a variety of ways. In some examples, token level confidence values returned from an automated speech engine may be used to regroup tokens (e.g., words) into phrases. The grouping logic may be based on a silence interval threshold (e.g., silence for more than a predetermined length of time may be determined to be the end of a phrase). For each phrase, the framework may generate a numeric confidence value (e.g., a weighted average of confidences of individual tokens in the phrase), which may be used to determine accuracy (e.g., a numeric confidence value beneath a threshold may be associated with low accuracy and a numeric confidence value above the threshold may be associated with high accuracy).

In some examples, the criteria for a high or low accuracy determination may differ based on a number of phrases in a video. As a specific example, (1) if a video has above a threshold number of phrases (e.g., five phrases) a first percentage of the phrases (e.g., 80%) must have a numeric confidence value above the threshold value to be tagged with a high accuracy rating but (2) if a video has below the threshold number of phrases, a second percentage of the phrases (e.g., 100%) must have a number confidence value above the threshold value to be tagged with a high accuracy rating.

In some examples, the disclosed framework may include a burned-in-caption detector (e.g., that is powered by machine-learning). In these examples, the framework may determine whether a video has burned-in captions. If a video is determined to have burned-in captions, the framework may (1) not generate auto-captions and/or (2) present a prompt to a user associated with the video (e.g., a creator and/or posting user) recommending that the user opt out of auto-generated captions (e.g., for the video) or remove the burnt-in captions.

In some examples, users posting videos may be provided with a settings prompt and/or interface that enables the user to control how auto-captions are used for a particular video and/or as a default for all videos posted by the user. Exemplary settings that may be selected by the user may include, without limitation, always requiring user review before publishing automatically generated captions, always publishing automatically generated captions without user review, never publishing automatically generated captions, adjusting a threshold accuracy level that triggers manual review, etc.

As will be explained in greater detail below, embodiments of the present disclosure may improve the field of video streaming by improving the accuracy, efficiency, and usability of speech-to-text transcription systems in the context of digital video publishing.

The following will provide, with reference to FIG. 1, detailed descriptions of computer-implemented methods for automatic speech-to-text captioning for video content (e.g., in a social media context). Detailed descriptions of corresponding example systems will also be provided in connection with FIG. 2. Detailed descriptions of interfaces and embodiments corresponding to the disclosed methods and systems will be provided in connection with FIGS. 3-12.

FIG. 1 is a flow diagram of an exemplary computer-implemented method 100. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (associated with a user 206). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at video streaming. In some examples, server 202 may perform video streaming functions in the context of social networking. The term "social networking" may refer to any type or form of digital communication that occurs between users of a social networking platform via an interface of the social networking platform. Examples of social networking may include, without limitation, text-based and/or image-based communication, video-based communication, audio-based communication, videoconferencing and/or audioconferencing, digital status broadcasting, private digital messaging, public content posting and/or commenting via a social media feed and/or a profile, etc. In some examples, server 202 may operate as part of and/or in connection with a social media platform 208. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, user 206 of user device 204 may be a user (e.g., a member) of a social networking platform (e.g., social media platform 208). In these examples, user device 204 may have installed an instance of a social media application 210, which may operate as part of social media platform 208 and through which one or more services provided by social media platform 208 (e.g., via server 202) may be accessible. In some examples, social media application 210 may be dedicated to a single service. For example, social media application 210 may represent a dedicated newsfeed application, a dedicated messaging application, a dedicated short-form video application, etc. In other examples, social media application 210 may provide access to multiple services (e.g., a combination of two or more of the social networking services described below). In addition, or as an alternative, to social media application 210, user device 204 may have installed a browser that may navigate to one or more webpages through which the one or more services provided by social media platform 208 (e.g., via server 202) may also be accessible.

In some examples, the steps shown in FIG. 1 may be performed (at least in part) by modules operating in an additional user device. In these examples, the additional user device may include any of the features described above in connection with user device 204 and may have installed an additional instance of social media application 210, which may operate as part of social media platform 208 and through which one or more services provided by social media platform 208 (e.g., via server 202) may be accessible.

As mentioned above, social media platform 208 may provide a variety of services (e.g., platforms and/or frameworks) for the users within its network (e.g., via server 202 and/or social media application 210). For example, social media platform 208 may provide a newsfeed service. The term "newsfeed" may generally refer to any type or form of social media consumption channel, provided via an interface, that presents a scrollable collection of newsfeed posts. In some examples, a newsfeed may scroll (e.g., upward or downward) to reveal the different posts within the newsfeed (e.g., in response to receiving user scrolling input). In one example, the scrollable collection may include newsfeed posts created by contacts of a particular user (e.g., friends of the particular user) and/or other users that the particular user is following (i.e., connected content). Additionally, the newsfeed may include non-connected content (e.g., content created by users who are not contacts of the particular user).

Figure 3:
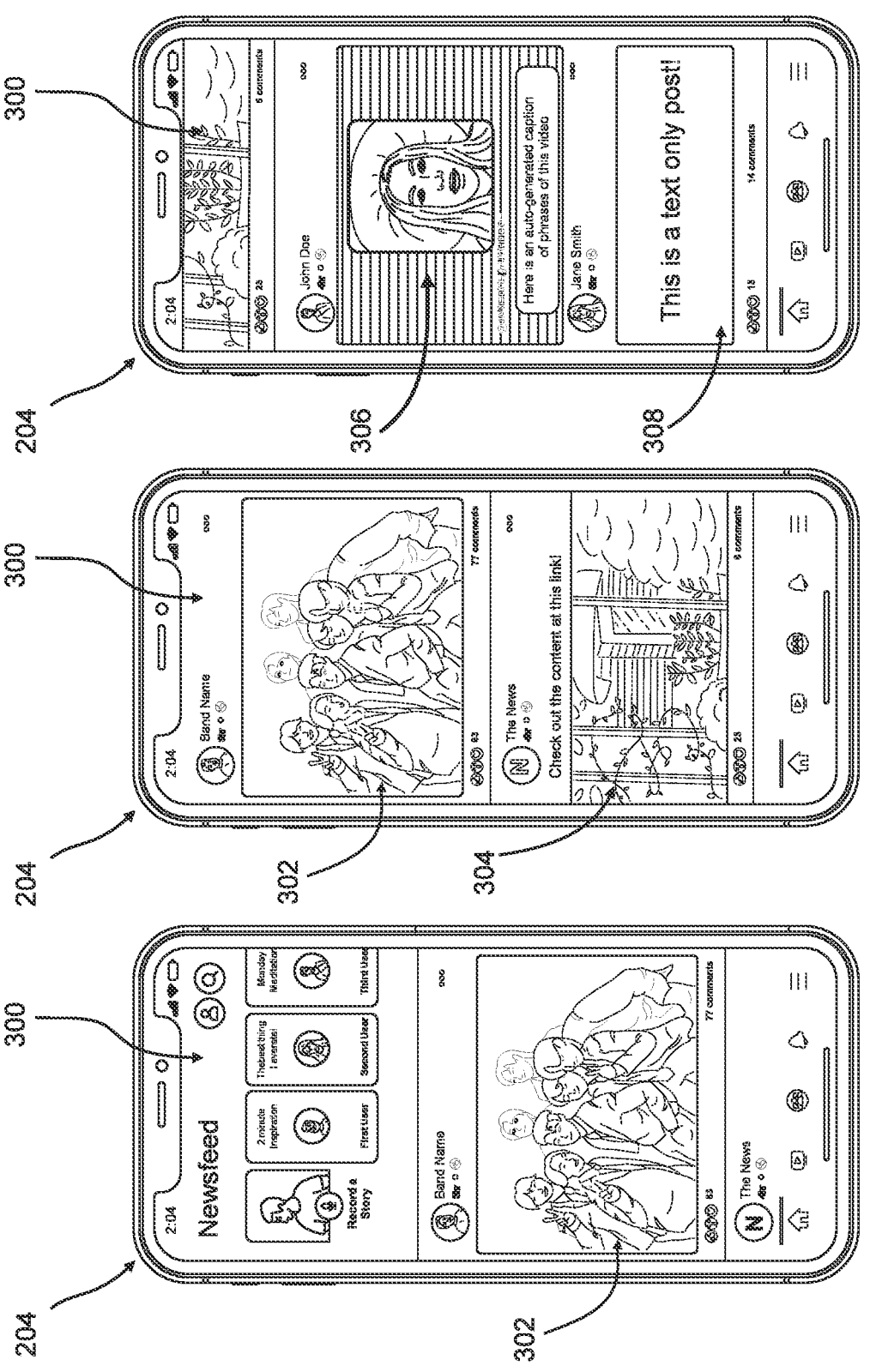
FIG. 3 is an illustration of an exemplary newsfeed interface.

The term "newsfeed post" generally refers to any type or form of digital composition that may be displayed in a newsfeed. Newsfeed posts may include a variety of content. For example, a newsfeed post may include, without limitation, text, an image, a video, a set of multiple images and/or videos, and/or a link (e.g., to a post, webpage, article, film, etc.). FIG. 3 depicts an exemplary newsfeed interface 300 with a newsfeed that includes an image-based newsfeed post 302, a link-based newsfeed post 304, a video-based newsfeed post 306, and a text-based newsfeed post 308.

In some examples, a newsfeed post may include a viewing pane for the content of the newsfeed post (e.g., the text in a text-based post, the image in an image-based post, etc.). A newsfeed post may also display a text-based caption, metadata content (e.g., content describing users that have been tagged in the newsfeed post, a timestamp, etc.), information indicating the source of the newsfeed post (e.g., the name of the creator of the post, a profile image, etc.), and/or a digital special effect (e.g., a digital sticker, a filter, an-augmented reality element, etc.). Such information and/or features may be displayed (and/or a menu corresponding to such information and/or features may be displayed) within the viewing pane (e.g., over the primary content), within the viewing pane and/or may be visually associated with the viewing pane (e.g., displayed beneath the viewing pane).

The newsfeed service may enable viewers of a newsfeed post to digitally respond to the newsfeed post in a variety of ways. In some examples, a newsfeed interface may enable a user to comment on a newsfeed post (e.g., via a text, image, and/or video-based reply) and may create a digital thread of comments corresponding to the newsfeed post (e.g., displayed beneath the newsfeed post and/or accessible via a comments affordance).

As another example, social media platform 208 may provide a digital stories service. The digital stories service may provide users with a digital stories feed, which presents a continuous series of digital story posts to a story-consumer, one by one (e.g., in a slideshow format). The term "digital story post" may generally refer to any type or form of digital composition intended for a digital stories feed. A digital story post may include a variety of content (e.g., a digital photograph, a graphic, text, a digital video, an artificial reality element, a digital audio recording, etc.). In one example, the story consumption channel may transition from presenting one digital story post to the next automatically, without requiring any user input to do so. In some examples, digital story posts from the same source (e.g., created and/or posted by the same user) may be grouped together, such that each digital story post from a particular source is displayed prior to displaying digital story posts from another source.

Figure 4:
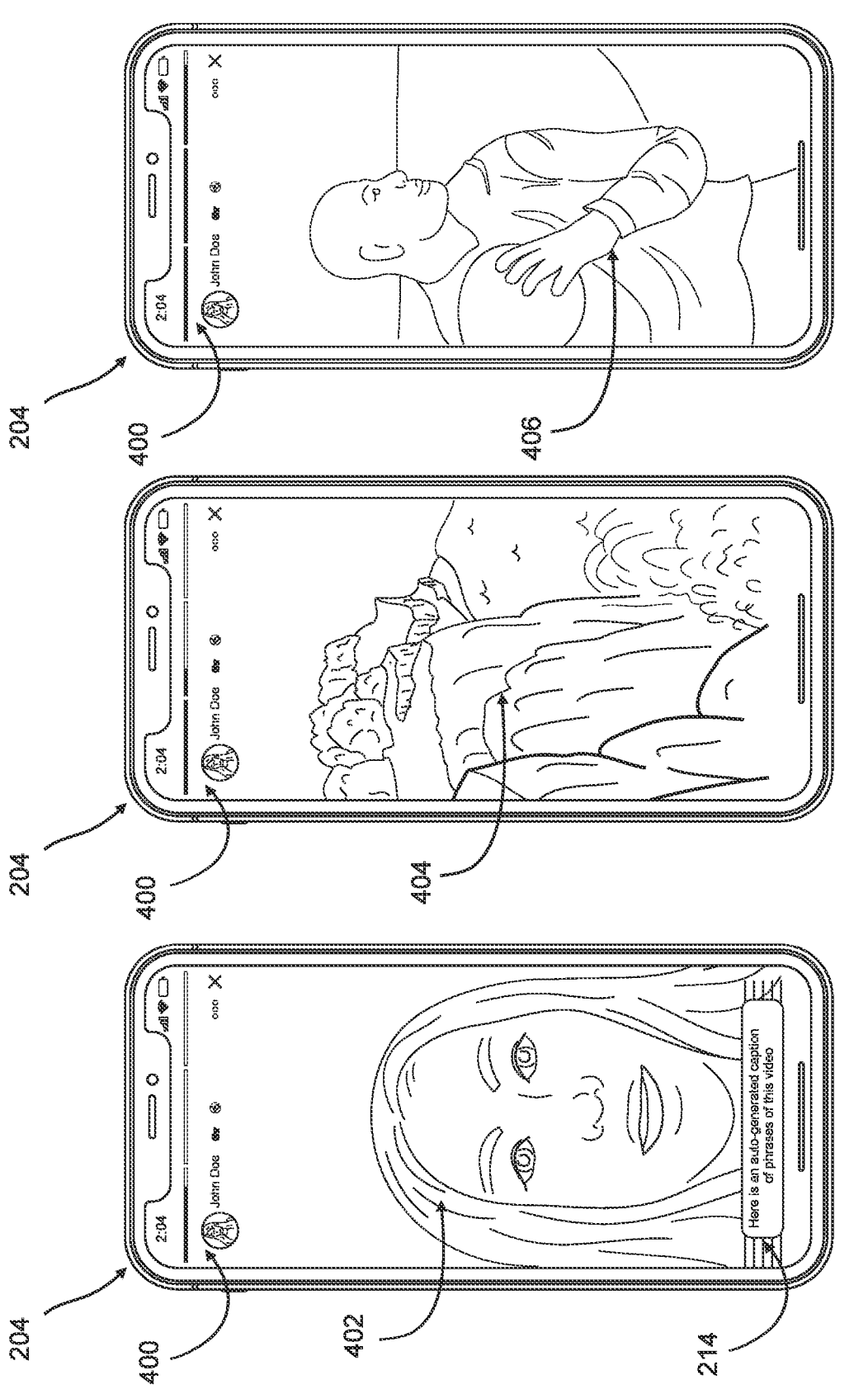
FIG. 4 is an illustration of an exemplary digital stories interface.

In one embodiment, a digital story post may be ephemeral. That is, the digital story post may only be viewable for a predetermined amount of time. For example, a digital story post may be set to disappear after twenty-four hours. Similar to the newsfeed service, the digital stories service may enable viewers of a story post to comment on the post, via a text and/or image-based reply and/or reply story, creating a digital thread of comments. Also similar to the newsfeed service, the digital stories service may configure a story feed for a particular user that includes connected content (e.g., story posts created by users who are contacts of the particular user or being followed by the particular user), non-connected content, or a determined ratio of connected content to non-connected content. FIG. 4 depicts an exemplary story interface 400 showing digital story posts 402, 404, and 406 of a user's digital story.

Figure 5:
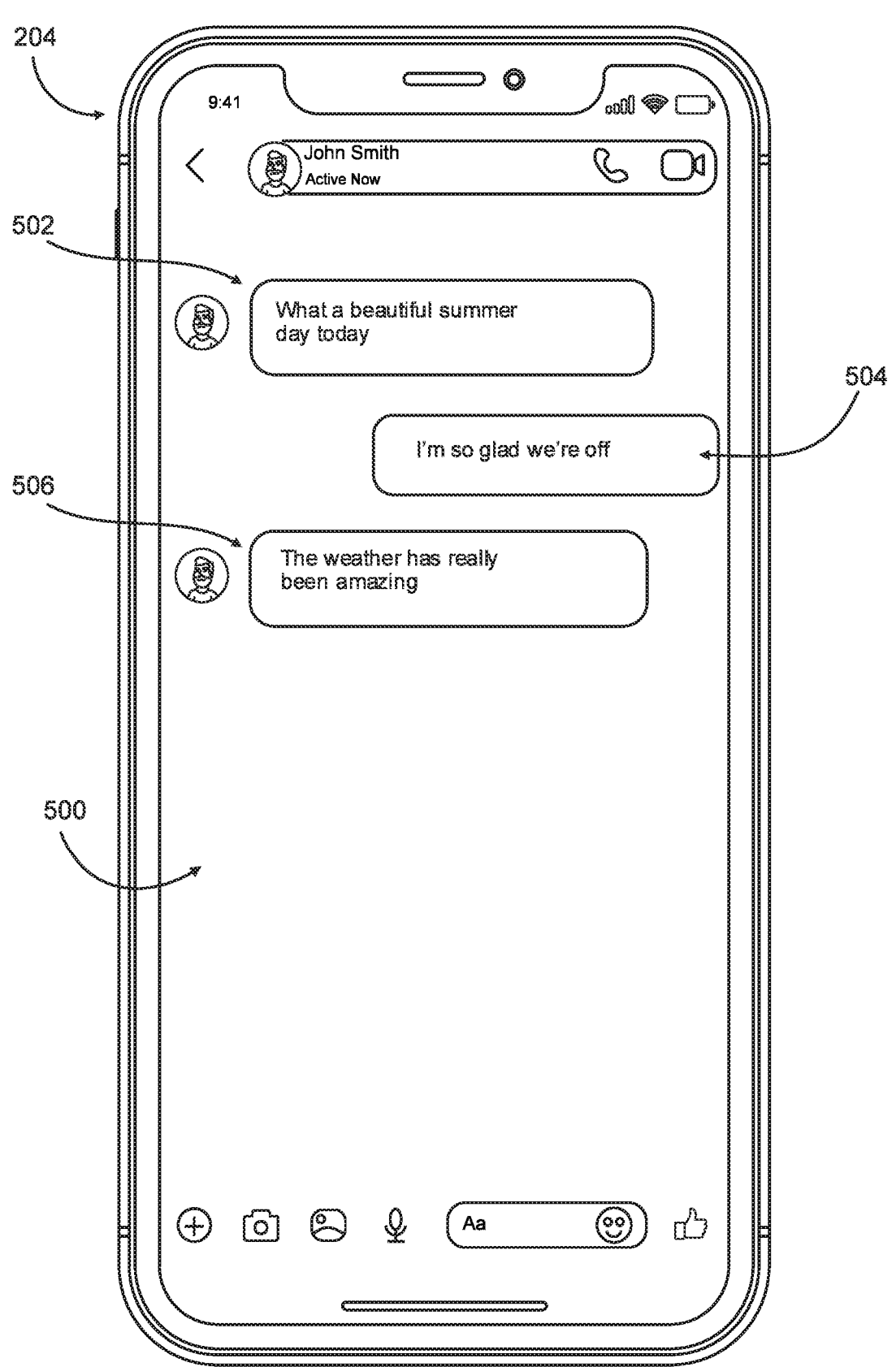
FIG. 5 is an illustration of an exemplary short-form video consumption interface.

As another example, social media platform 208 may provide a messaging service. The term "messaging service" may generally refer to any type or form of digital message delivery system that enables users of social media platform 208 to exchange messages (e.g., text messages, audio messages, and/or video messages). FIG. 5 depicts an exemplary messaging interface 500 showing digital message posts 502, 504, and 506 of a digital messaging thread.

In some examples, social media platform 208 may provide a short-form video service (e.g., a reels service) that enables users to create short-form videos and/or consume (e.g., watch and/or digitally respond to) short-form videos created by other users. In one embodiment, social media platform 208 may create a short-form video feed for each user of its short-form video service. The term "short-form video" may generally refer to a digital video configured for short-form video feed consumption. In some examples, a platform for creating and/or posting a short-form video may only enable the creation and/or posting of short-form videos that are a certain length and/or that are less than a certain length (e.g., less than thirty seconds in length).

The term "short-form video feed" may generally refer to a series (e.g., a queue) of digital short-form videos (e.g., selected for a particular user) that social media application 210 (or a corresponding webpage) is configured to play, one by one, as a continuous series (e.g., advancing from one short-form video to the next automatically). In some examples, a short-form video feed may be configured to play short-form videos asynchronously (e.g., to play a continuously evolving queue of pre-recorded short-form videos). In some examples, short-form videos may be continuously added to a user's short-form video feed as the short-form videos of the feed are consumed (e.g., such that a determined number of short-form videos are always in queue to be played).

Figure 6:
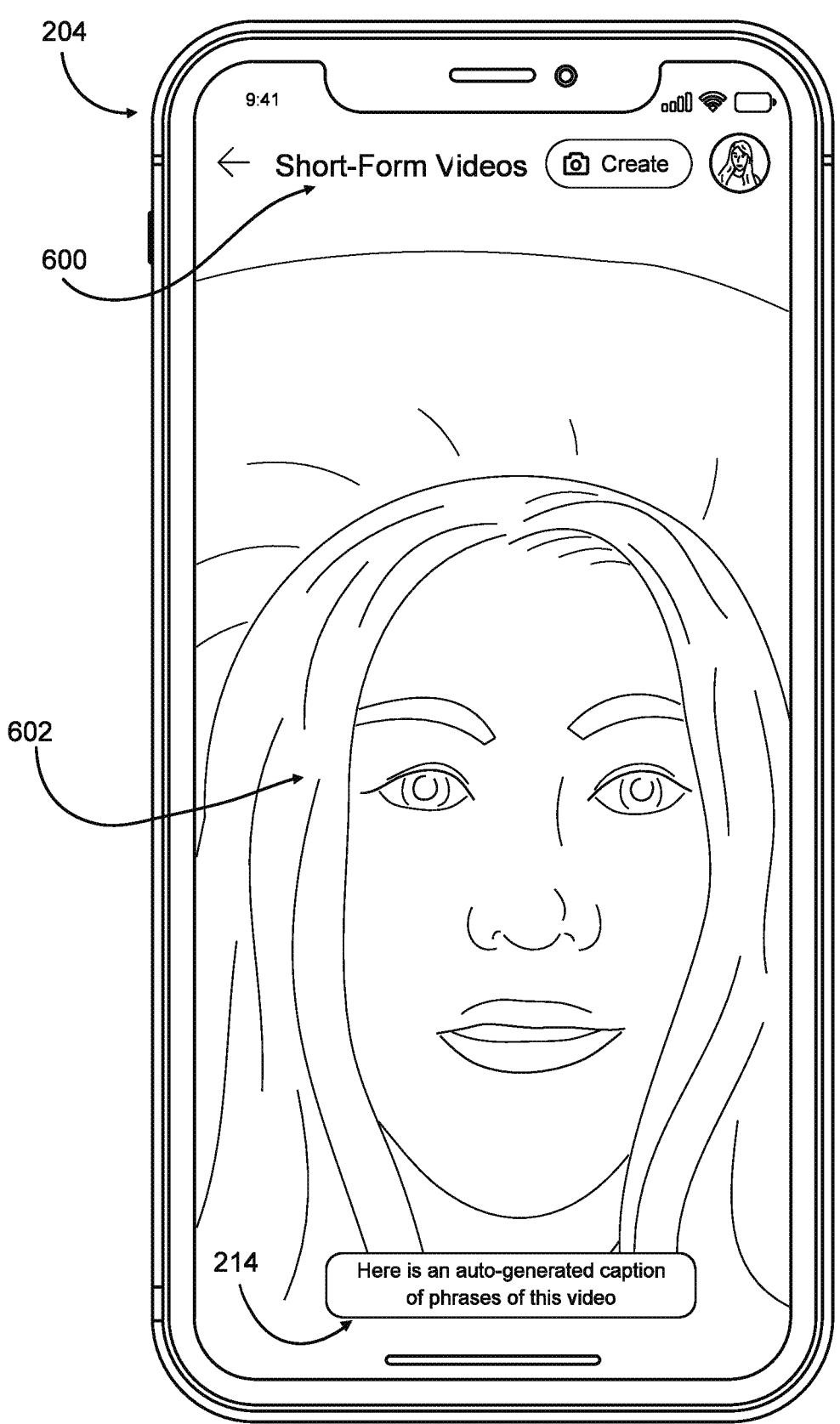
FIG. 6 is an illustration of an exemplary messaging interface.

In some examples, a short-form video feed may be presented via a dedicated short-form video feed interface. FIG. 6 depicts an exemplary dedicated short-form video feed interface 600 presenting a short-form video 602. Short-form videos may be selected for the short-form video feed of a particular user based on a variety of metrics. For example, a short-form video may be selected based on a topic the short-form video has been tagged with (e.g., in response to a determination that the particular user is interested in and/or predicted to be interested in the topic). As another example, a short-form video may be selected based on a user who created the short-form video (e.g., in response to a determination that the particular user is following the user and/or is predicted to be interested in content by the creator). As another example, a short-form video may be selected based on a popularity of the short-form video.

In some embodiments, a short-form video may be displayed (e.g., streamed) with a variety of information relating to the short-form video. Such information may include, for example, a name and/or profile element of an account that created the short-form video, a title of the short-form video, viewer responses to the short-form video and/or an affordance that navigates to viewer responses to the short-form video, one or more elements for providing a digital social response to the short-form video, a transcript of the short-form video, etc.

Figure 7:
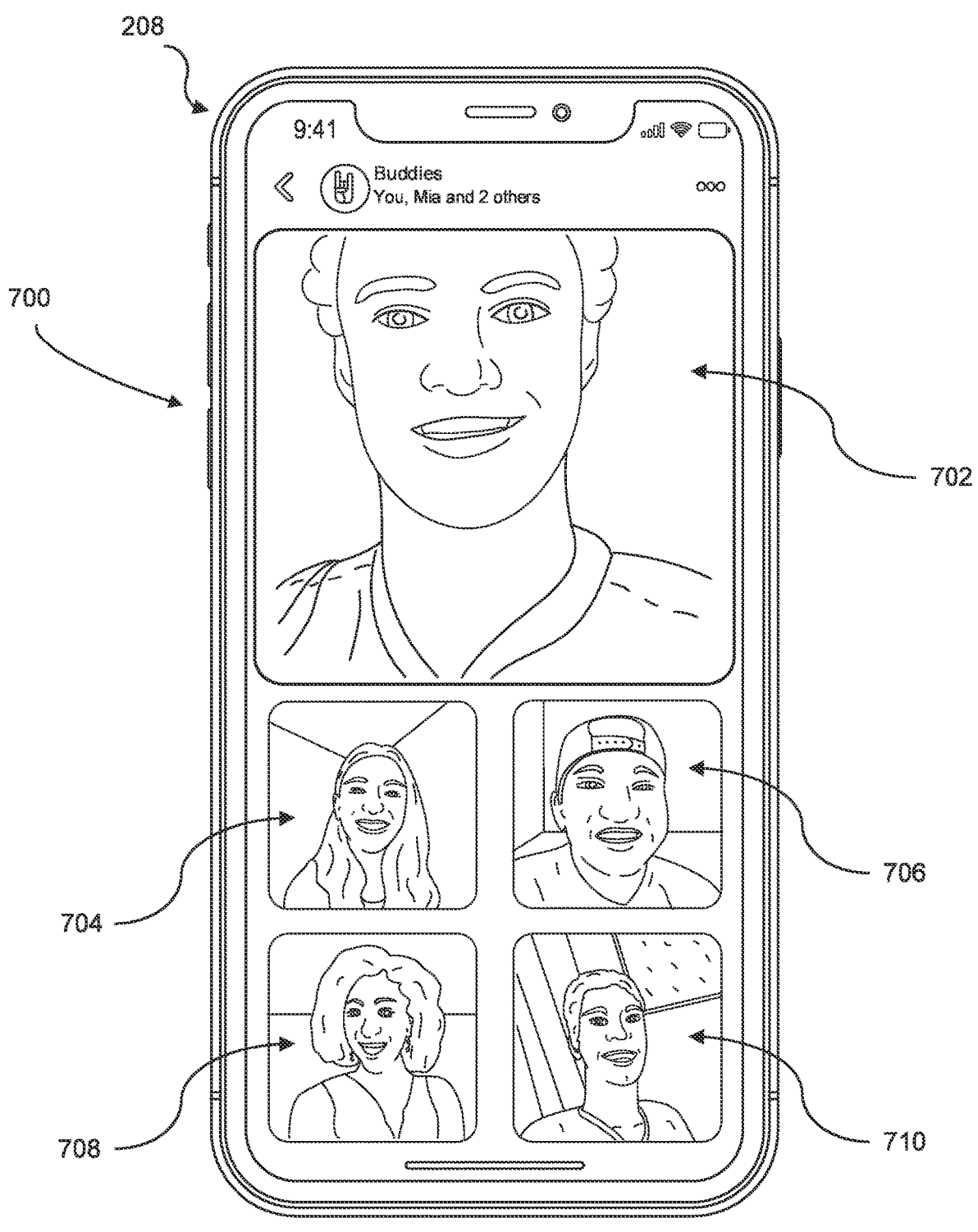
FIG. 7 is an illustration of an exemplary videoconferencing interface.

As another example, social media platform 208 may provide a media conferencing (e.g., audioconferencing and/or videoconferencing) service (e.g., a "rooms" service) for hosting media calls (e.g., audio calls and/or video calls). The media conferencing service may operate as a stand-alone service and/or may be integrated with another service (e.g., a messaging service, a social workplace service, etc.). The term "media conferencing service" refers to any type or form of streaming and/or videotelephony service that enables the digital transmission and/or sharing of real-time media (e.g., video and/or audio) streams (e.g., from multiple endpoints) via a media conferencing interface. The term "real-time media stream" generally refers to any type or form of multimedia that is transmitted in real time (e.g., as a series of frames) from an endpoint (i.e., a transmitting device) to one or more additional endpoints. Audio and/or frames may be played and/or displayed by an endpoint (to a user) as the audio and/or frames are received. FIG. 7 depicts an exemplary videoconferencing interface 700 with video tiles 702, 704, 706, 708, and 710 (each presenting a video stream of a user).

Figure 2:
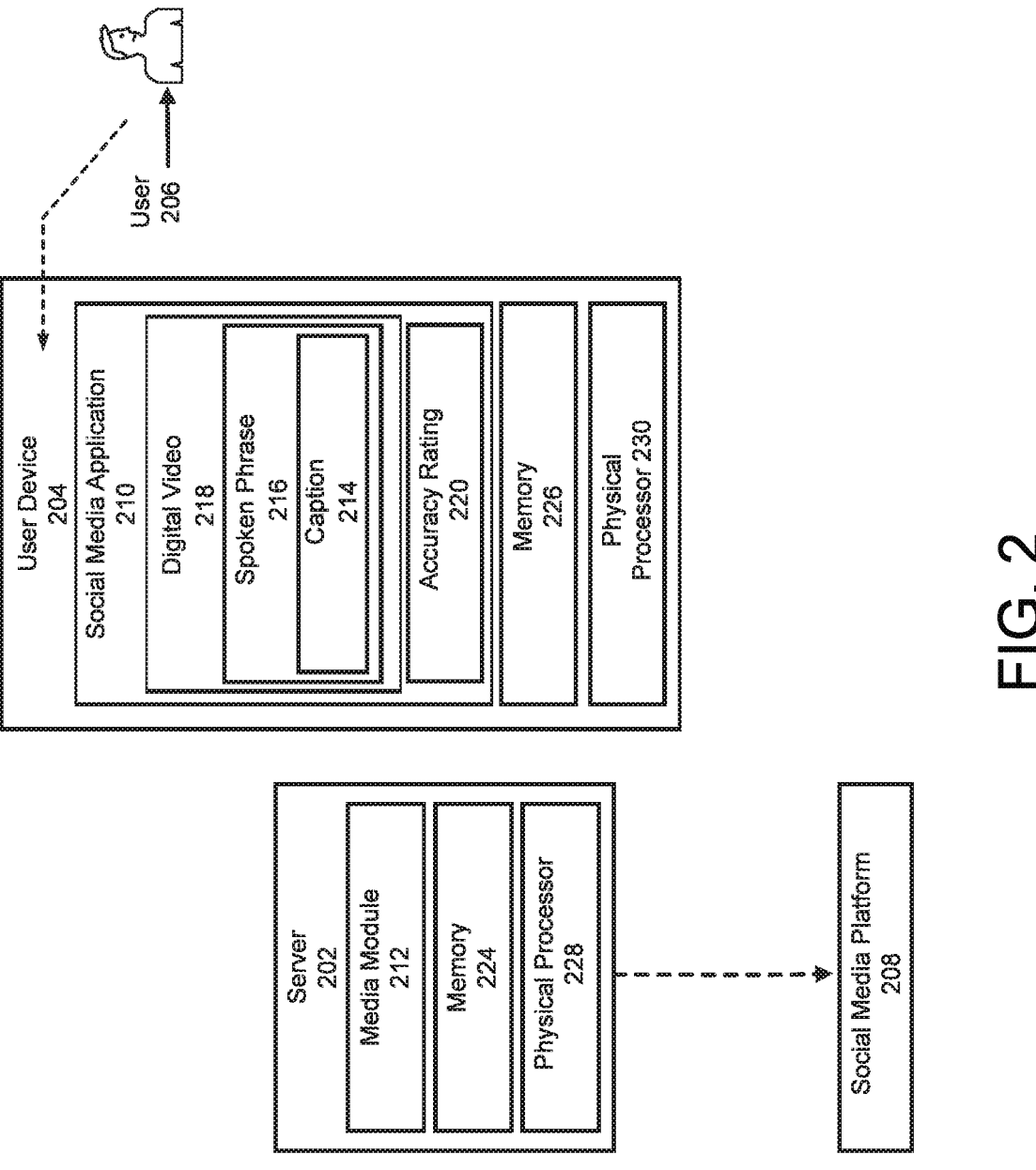
FIG. 2 is a block diagram of an exemplary system for automated speech-to-text captioning.

Returning to FIG. 1, at step 110, one or more of the systems described herein may generate a caption for a spoken phrase in a video. For example, as illustrated in FIG. 2, a media module 212 may generate a caption 214 for a spoken phrase 216 in a digital video 218.

Digital video 218 may represent any type or form of video in a digital format that includes audio. Caption 214 may represent any type or form of automatically (e.g., algorithmically) generated speech-to-text caption (e.g., written transcription) of a phrase detected in the audio of digital video 218. Media module 212 may generate caption 214 using any type or form of automatic speech recognition (ASR) and/or speech-to-text translation system. Examples of such systems may include, without limitation, a hidden Markov model (HMM), a deep neural network (DNN), a connectionist temporal classification (CTC) model, a deep recurrent neural network (DRNN), a bream search and decoding model, etc. Media module 212 may detect the spoken phrase corresponding to caption 214 in a variety of ways. In one example, media module 212 may identify the spoken phrase using grouping logic based on a silence interval threshold to determine a start and an end of the phrase. Additional or alternative examples include, without limitation, identifying the spoken phrase using language models (e.g., that capture the likelihood of word sequences occurring in a given language), sentence boundaries, and/or semantic cues.

Media module 212 may generate caption 214 in a variety of contexts. In some examples, media module 212 may operate in connection with a video streaming platform (e.g., operating as part of social media platform 208) in which digital videos are uploaded by different end users (e.g., posted to the platform as part of a social media post such as a newsfeed post, a stories post, a short-form video post, a private message post, a video conferencing post and/or presentation, etc.).

Returning to FIG. 1, at step 120, one or more of the systems described herein may determine an accuracy rating for the caption. For example, as illustrated in FIG. 2, media module 212 may determine an accuracy rating 220 for caption 214. Media Module 212 may determine the accuracy rating in a variety of ways. In some examples, media module 212 may (1) generate a token-level confidence value for each word in the spoken phrase (e.g., generated using an acoustic and/or language modeling system) and (2) generate a numeric confidence value for the spoken phrase based on a weighted average of the token-level confidence values of each of the words in the phrase. In some examples, the average may represent a weighted average (e.g., weighted based on the duration of each word).

At step 130, one or more of the systems described herein may, in response to determining that the accuracy rating is below an accuracy threshold, prompt a user to review the caption prior to publishing the caption. For example, as illustrated in FIG. 2, media module 212 may, in response to determining that accuracy rating 220 is below an accuracy threshold, prompt user 206 to review caption 214 prior to publishing caption 214.

The accuracy threshold may be determined in a variety of ways. In some examples, the accuracy threshold may represent a percentage (e.g., 80%) dictated by a policy. In certain examples, the accuracy threshold may change based on a number of phrases in the video (e.g., in a full video and/or a designated segment of a video). For example, the accuracy threshold for a video that includes more than a specified number of phrases may be lower than the accuracy threshold for a video that has fewer than the specified number of phrases. As a specific example, (1) for videos that include more than five phrases, the accuracy threshold may be 80% but (2) for videos that include fewer than five phrases, the accuracy threshold may be 95%. As another example the accuracy threshold may change based on a length of a video. For example, the accuracy threshold for a video that is longer than a specified length may be lower than the accuracy threshold for a video that is shorter than the specified length. The accuracy threshold may be set in a variety of ways. In some examples, the threshold may be determined dynamically (e.g., based on a number of users who go back to review a caption when different thresholds are used).

Figure 8:
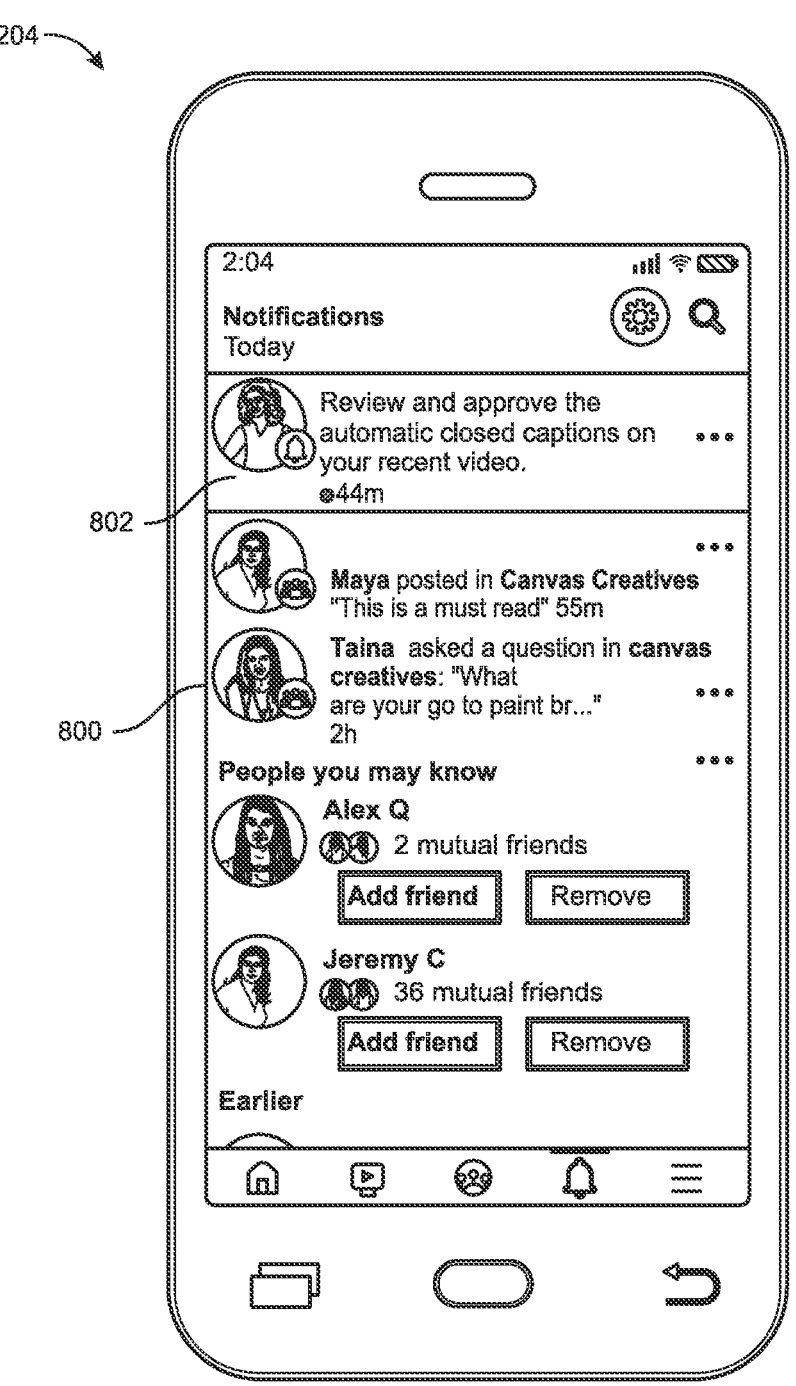
FIG. 8 is an illustration of an exemplary caption-review prompt included in a notifications interface.

Media module 212 may prompt user 206 to manually review caption 214 in a variety of ways. In some examples, media module 212 may present user 206 with a digital prompt (provided as an interface or an element of an interface). In one embodiment, the prompt may be presented to user 206 as part of a social media composition process in which user 206 uploaded digital video 218. In this embodiment, media module may have generated caption 214 in response to receiving digital video 218 via the social media composition process. In one embodiment, media module 212 may prompt user 206 to manually review caption 214 via a notifications menu. FIG. 8 depicts an exemplary notifications menu 800 with a notification 802 prompting user 206 to review caption 214.

Figure 9:
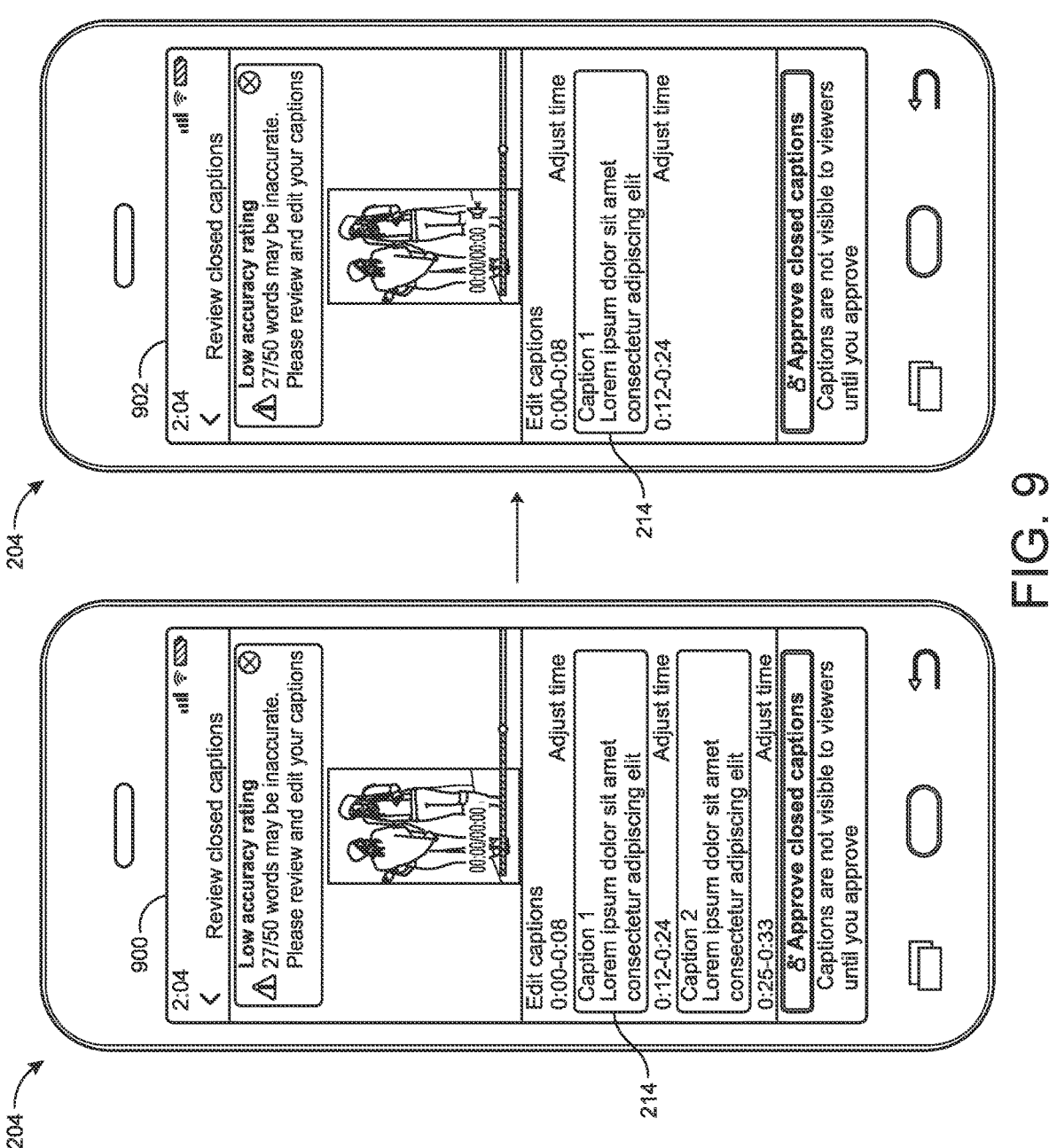
FIG. 9 is an illustration of an exemplary low-accuracy caption review interface flow.
Figure 9:
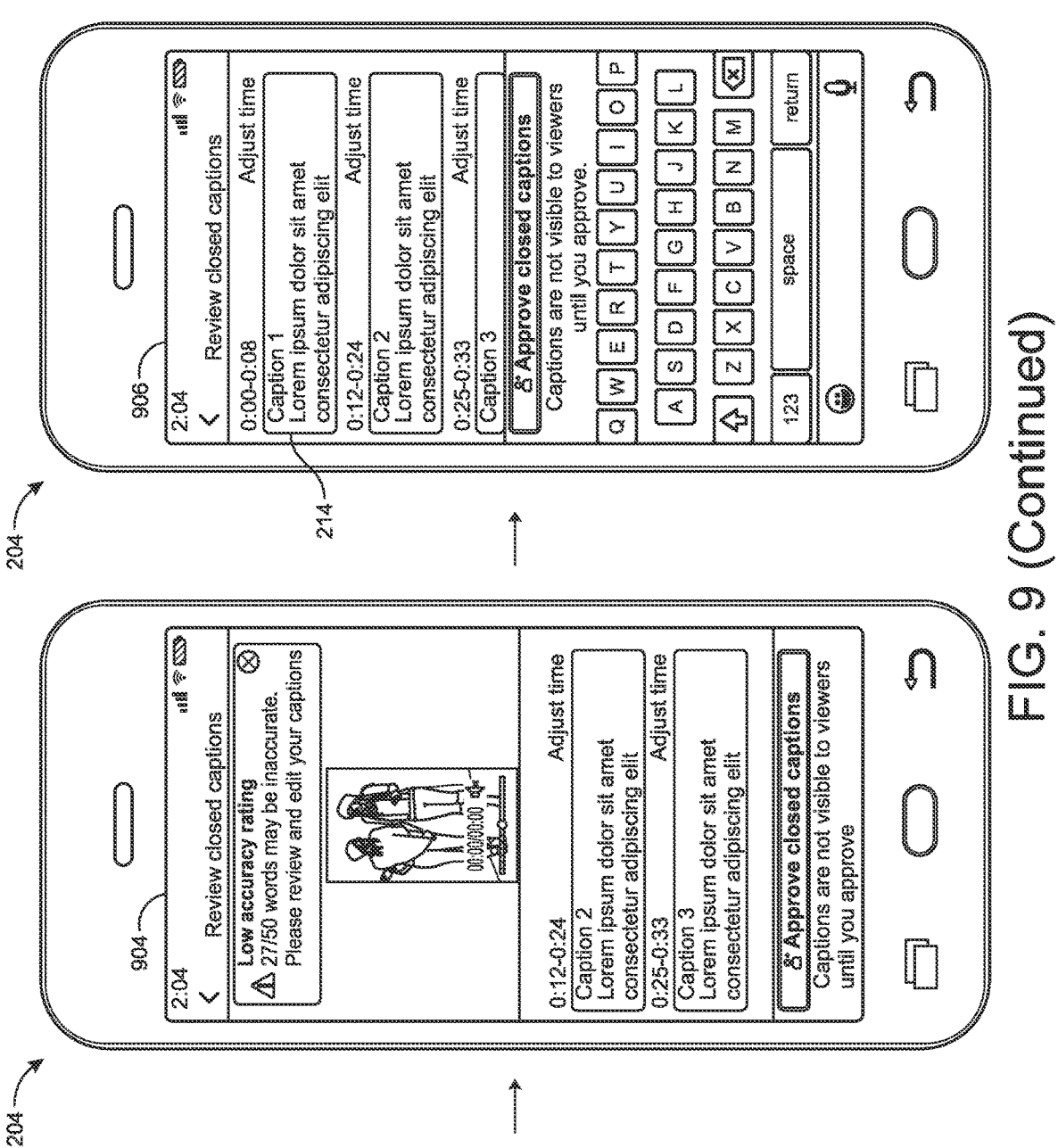
Figure 10:
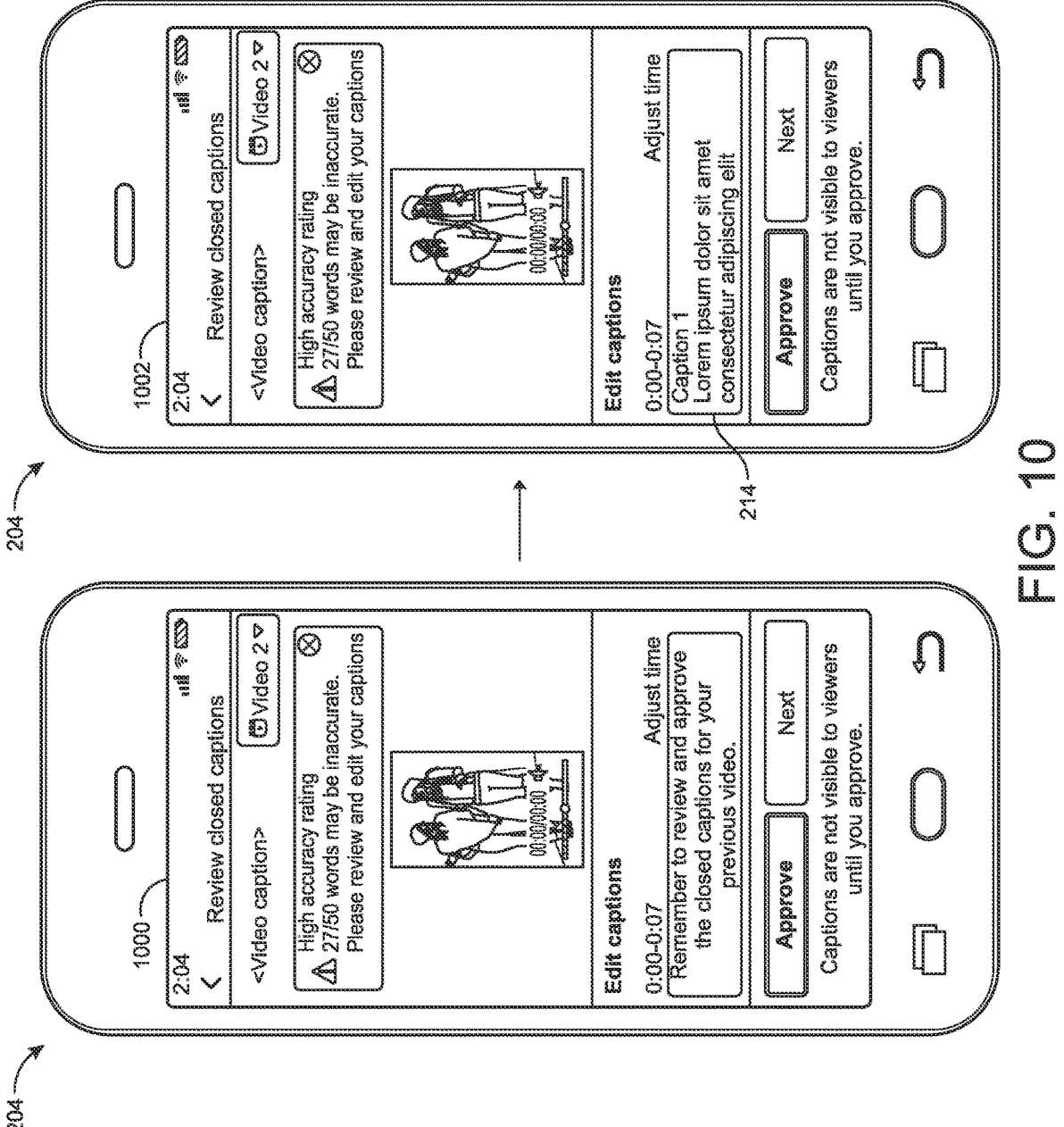
FIG. 10 is an illustration of an exemplary high-accuracy caption review interface flow.
Figure 10:
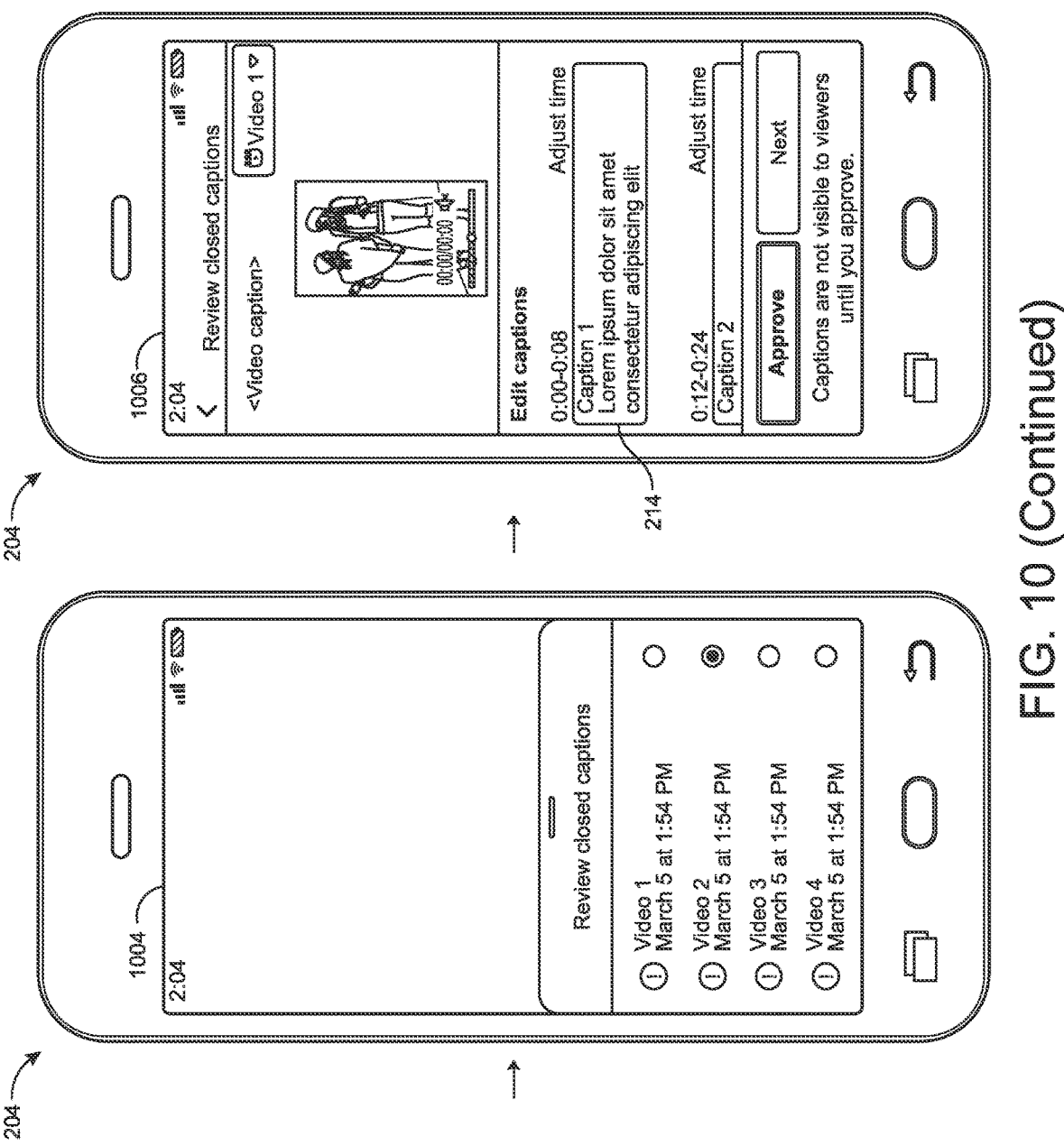

In some examples, upon prompting user 206 to manually edit caption 214, media module 212 may (1) receive user input accepting the prompt to manually review caption 214, (2) in response to receiving this user input, provide user 206 with an interface that enables viewing and editing caption 214, (3) receive one or more edits to caption 214 via user input to the interface, and (4) publish the edited caption with digital video 218. FIG. 9 depicts an exemplary flow of interfaces 900, 902, 904, and 906 for reviewing caption 214 in an embodiment in which caption 214 received a low accuracy rating. FIG. 10 depicts an exemplary flow of interfaces 1000, 1002, 1004, and 1006 for reviewing caption 214 in an embodiment in which caption 214 received a high accuracy rating.

Media module 212 may publish caption 214 (e.g., after caption 214 has been manually edited and/or approved) with digital video 218 in a variety of contexts. In examples in which the disclosed framework operates as part of a video streaming platform, media module 212 may publish the edited caption with digital video 218 to a consumption channel of the video streaming platform. In examples in which the video streaming platform represents (or operates as part of) social media platform 208, the video streaming platform may represent a social media consumption channel (e.g., a newsfeed channel, a dedicated video-watch channel, a stories channel, a short-form video channel, etc.).

In certain examples, media module 212 may determine that accuracy rating 220 for caption 214 is above the accuracy threshold. In some such examples, instead of prompting user 206 to manually review caption 214, media module 212 may be configured to automatically publish caption 214 without manual review.

In some embodiments, media module 212 may further be configured to determine (e.g., prior to generating caption 214) whether digital video 218 includes burned-in captions. In these embodiments, in response to determining that digital video 218 includes burned-in captions, media module 212 may (1) provide user 206 with a prompt recommending that user 206 select to not have the disclosed framework generate automatic captions, (2) not generate automatic captions for digital video 218, and/or (3) provide user 206 with a prompt recommending that user 206 remove the burned-in captions and use disclosed framework's automatic captions instead of the burned-in captions.

Figures 11, 12:
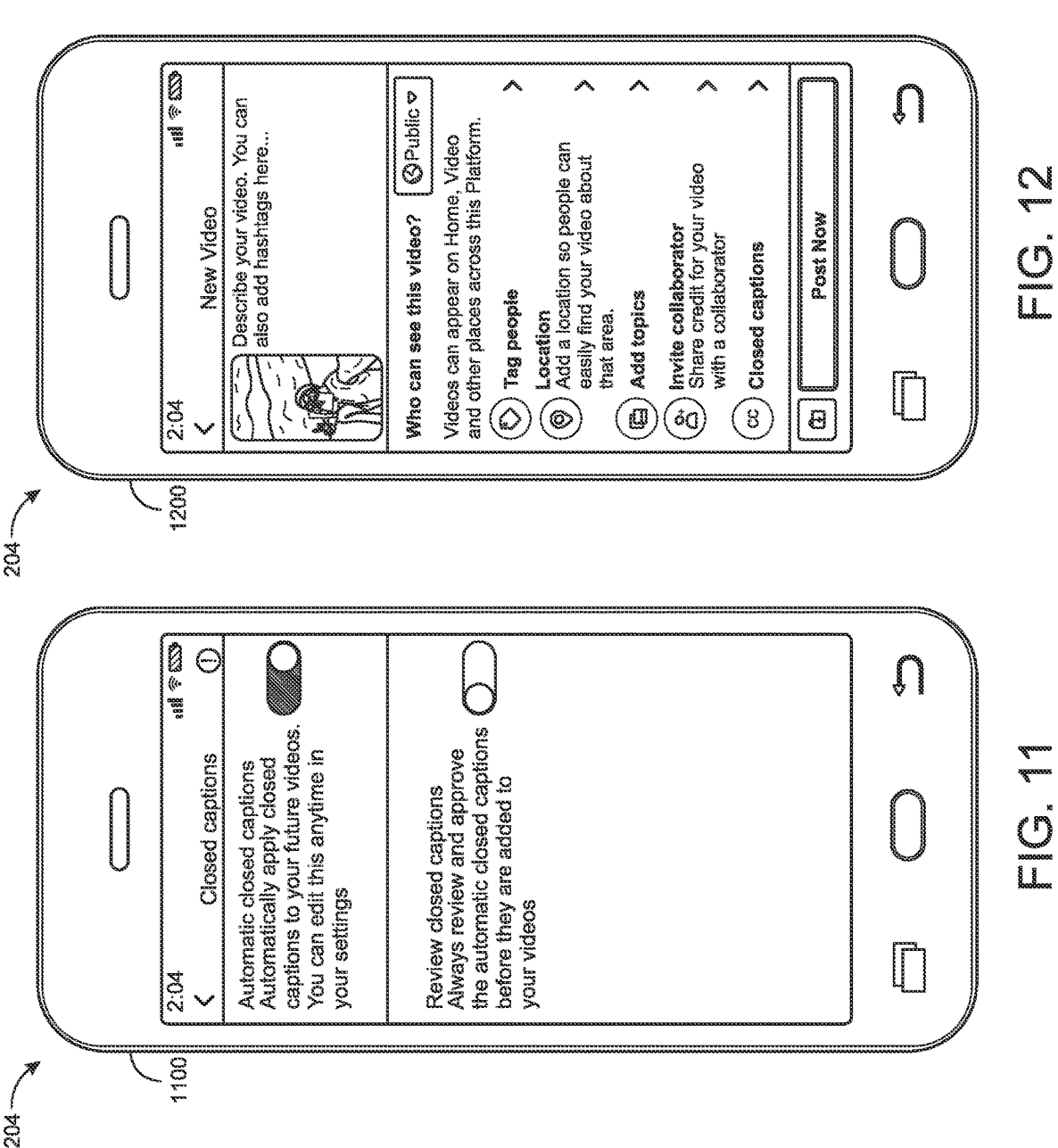
FIG. 11 is an illustration of an exemplary caption settings interface.
FIG. 12 is an illustration of an exemplary short-form video settings interface that includes a setting for captions specific to a particular short-form video.

In some examples, media module 212 may enable user 206 to select a setting relating to caption review. For example, media module 212 may enable user 206 to select (1) an always-review setting in which captions generated for any video provided by the user is provided to the user for manual review prior to publishing and/or to select review (e.g., even captions whose predicted accuracy are above the accuracy threshold) or (2) a never-review setting in which captions generated for all videos provided by the user are published without manual review (e.g., even captions whose predicted accuracy falls below the accuracy threshold). FIG. 11 provides an exemplary captions-settings interface 1100. FIG. 12 provides an exemplary video-settings interface 1200 that includes an element for selecting a caption setting for one particular video corresponding to video-settings interface 1200.

In some examples in which media module 212 receives manual user edits to caption 214, media module 212 may use these edits to further train and refine a language processing model (e.g., a machine learning engine) used to generate the automatic captions. Thus, the disclosed framework may continually improve over time.

User interfaces corresponding to the methods and systems described above may be surfaced as part of a variety of navigational flows. In some examples, a navigational flow may include a combination of user interfaces described herein and additional user interfaces not described herein. Each user interface described herein may be surfaced from a variety of entry points. In some examples, the user interfaces described here may be interconnected (e.g., with one interface navigating to another).

In the embodiments depicted in the figures herein (e.g., FIGS. 3-12), the exemplary interfaces have been optimized for a mobile device. Additional or alternative embodiments of these exemplary interfaces may be optimized for other types of computing devices (e.g., a desktop computer, a laptop computer, a wearable device, etc.). In some examples, some or all of the content of these interfaces maybe dynamically modified (e.g., customized for a particular user). For example, posts within a social media feed may be dynamically selected (e.g., based on a variety of inputs, as will be described in greater detail below).

Each of the computer-mediated actions described herein may be performed by a module (e.g., media module 212) that operates within an endpoint device (e.g., user device 204) and/or that operates within a backend server (e.g., server 202). In the examples in which an action involves presenting digital content to a user via an endpoint device and/or receiving user input and/or digital feedback from the user to the endpoint device, the module may perform the action directly, in examples in which the module operates within the endpoint device (e.g., by displaying content via a display element of the endpoint, receiving tapping input to a touchscreen of the endpoint device, and/or receiving input to an auxiliary device communicatively coupled to the endpoint device such a digital mouse and/or a keyboard), and/or indirectly (e.g., in examples in which the module operates within the server). In examples in which a module performs an action indirectly, the module may perform the action in a variety of ways. For example, the module may perform the action by instructing the endpoint device to perform the action, by transmitting content to the endpoint device to be presented by the endpoint device, by providing the endpoint with an application (e.g., social media application 210) that performs the action, by receiving an indication of user input to the endpoint device from the endpoint device, etc. Additionally, in some examples, the module may perform an action operating in a combination of an endpoint device and a backend server.

Each of the digital actions described above may be performed in conjunction with a permissions framework (e.g., a data privacy framework) that enables a user to select how data is selected for the user, how data relating to the user is collected, and how data relating to the user is shared with other users. In some examples, user 206 may provide permission for an action via a digital permissions process (e.g., via input to a permissions menu and/or page). In some examples, the digital permissions process may be directed to selecting an audience for a user generated post. Additionally or alternatively, the digital permissions process may be directed to permitting information about the user (e.g., a status and/or availability) to be broadcast (e.g., within a profile element and/or contact list). As another example, the digital permissions process may be directed to collecting user history (e.g., to apply to a machine learning system used to select content for the user).

In some of the embodiments described above, the disclosed systems may enable a user to create content (e.g., a social media post for a social media feed and/or a digital message for a private digital messaging thread) via a content-creation interface. In these embodiments, the content-creation interface may enable a content creation that includes a variety of types of content. Such content may include, without limitation, an image, a video, audio content, a graphic (e.g., a digital sticker), a special effect (e.g., an augmented reality effect), a filter, etc. The content-creation interface may enable a user to provide content (e.g., for a digital composition such as a post and/or message) in a variety of ways. In some examples, the content-creation interface may enable a user to create (e.g., generate) content via the content-creation interface. For example, the content-creation interface may include a digital canvas that enables a user to digitally draw content and/or may include a capture screen that enables the user to capture visual content via a camera of the user's device and/or audio content via a microphone of the user's device. As another example, the content-creation interface may include a text-input box that enables the user to input text (e.g., via typing input). Additionally or alternatively, the content-creation interface may enable the user to upload content. For example, the content-creation interface may include a drag-and-drop functionality and/or may present content (e.g., images stored in a camera roll of the user's device where permission to access the images has been provided) that may be selected to be included in the user's content creation. In addition to enabling a user to provide (e.g., create and/or upload) content, the content-creation interface may enable a user to modify (e.g., customize) content. For example, the content-creation interface may include a text-customization feature that enables a user to customize the appearance of text (e.g., selecting a size, color, font, and/or position of text). As another example, the content-creation interface may enable a user to select a filter and/or special effect to be applied over content.

In some of the embodiments described above, a module (e.g., media module 212) may select content for user 206. For example, a module may select social media consumption content for user 206 (e.g., a social media composition for a social media feed and/or a social media feed relating to a particular topic or theme) and/or suggested additional users for user 206 (e.g., users with whom to co-view a social media feed, a digital group to join, etc.). In these embodiments, the module may select content for user 206 in a variety of ways. For example, social media consumption content may be selected based on a relationship between user 206 and a creator of the social media consumption content (e.g., in response to determining that the creator is a contact of user 206 and/or that user 206 is following the creator), a user history and/or demographic of user 206 (e.g., indicative of a user interest), user data relating to a contact of user 206 and/or users with a features in common with user 206, etc. As another example, an additional user may be selected for user 206 based on a relationship between user 206 and the additional user (e.g., a relationship claimed by user 206 within social media platform 208, a number of social connections between user 206 and the additional user such as a number of mutual contacts, and/or a metric relating to an amount of digital interaction between user 206 and the additional user within social media platform 208). In some examples, content may be selected for user 206 by a machine learning system (e.g., a neural network). In these examples, the machine learning system may select the content in response to receiving a variety of inputs. Such inputs may include inputs relating to user 206 (e.g., an input derived from a user history, an expressed user preference, etc.), inputs relating to users with a features in common with user 206, inputs relating to a demographic and/or a region associated with user 206, inputs derived from a social graph, inputs relating to potential content that may be selected for user 206 (e.g., a topic of such content and/or a popularity of such content), etc.

EXAMPLE EMBODIMENTS

Example 1. A computer-implemented method including generating a caption for a spoken phrase in a video, determining an accuracy rating for the caption, and in response to determining that the accuracy rating is below an accuracy threshold, prompting a user to manually review the caption prior to publishing the caption.

Example 2. The computer-implemented method of example 1, further including identifying the spoken phrase in the video using grouping logic based on a silence interval threshold to determine a start and an end of the spoken phrase.

Example 3. The computer-implemented method of examples 1-2, where determining the accuracy rating includes generating a token-level confidence value for each word in the spoken phrase, and generating a numeric confidence value for the spoken phrase based on an average of the token-level confidence values of each word in the spoken phrase.

Example 4. The computer-implemented method of examples 1-3, where the accuracy threshold is based on a number of phrases in at least one of the video or a segment of the video corresponding to the spoken phrase.

Example 5. The computer-implemented method of example 4, where an accuracy threshold for a video or video segment that includes more than a specified number of phrases is lower than an accuracy threshold for a video or video segment that has fewer than the specified number of phrases.

Example 6. The computer-implemented method of examples 1-5, further including receiving user input accepting the prompt to manually review the caption, in response to receiving the user input, providing the user with an interface that enables viewing and editing the caption, receiving one or more edits to the caption via user input to the interface, and publishing the edited caption with the video.

Example 7. The computer-implemented method of example 6, where publishing the edited caption with the video includes posting the video, including the edited caption, to a consumption channel of a social media platform.

Example 8. The computer-implemented method of examples 1-7, further including generating an additional caption for an additional spoken phrase in an additional video, and determining an additional accuracy rating for the additional caption.

Example 9. The computer-implemented method of example 8, further including, in response to determining that the additional accuracy rating is above the accuracy threshold, automatically publishing the additional caption with the additional video without prompting the user to manually review the additional caption.

Example 10. The computer-implemented method of examples 8-9, further including determining that the additional video includes burned-in caption, and in response to determining that the additional video includes the burned-in captions, at least one of providing the user with a prompt recommending that the user disable automatic captioning for the additional video, posting the additional video without generating automatic captions for the additional video, or providing the user with a prompt recommending that the user remove the burned-in captions.

Example 11. The computer-implemented method of examples 1-10, further including at least one of enabling the user to select an always-review setting in which captions generated for any video provided by the user is provided to the user for manual review prior to publishing, or enabling the user to select a never-review setting in which captions generated for all videos provided by the user are published without manual review.

Example 12. A system including at least one physical processor, and physical memory including computer-executable instructions that, when executed by the physical processor, cause the physical processor to generate a caption for a spoken phrase in a video, determine an accuracy rating for the caption, and in response to determining that the accuracy rating is below an accuracy threshold, prompt a user to manually review the caption prior to publishing the caption.

Example 13. The system of example 12, where the computer-executable instructions further cause the physical processor to identify the spoken phrase in the video using grouping logic based on a silence interval threshold to determine a start and an end of the spoken phrase.

Example 14. The system of examples 12-13, where determining the accuracy rating includes generating a token-level confidence value for each word in the spoken phrase, and generating a numeric confidence value for the spoken phrase based on an average of the token-level confidence values of each word in the spoken phrase.

Example 15. The system of examples 12-14, where the accuracy threshold is based on a number of phrases in at least one of the video or a segment of the video corresponding to the spoken phrase.

Example 16. The system of example 15, where an accuracy threshold for a video or video segment that includes more than a specified number of phrases is lower than an accuracy threshold for a video or video segment that has fewer than the specified number of phrases.

Example 17. The system of examples 12-16, where the computer-executable instructions further cause the physical processor to receive user input accepting the prompt to manually review the caption, in response to receiving the user input, provide the user with an interface that enables viewing and editing the caption, receive one or more edits to the caption via user input to the interface, and publish the edited caption with the video.

Example 18. The system of example 17, where publishing the edited caption with the video includes posting the video, including the edited caption, to a consumption channel of a social media platform.

Example 19. The system of example 18, where the consumption channel includes at least one of a short-form video channel, a newsfeed channel, or a stories channel.

Example 20. A non-transitory computer-readable medium including one or more computer-readable instructions that, when executed by at least one processor of a computing device, cause the computing device to generate a caption for a spoken phrase in a video, determine an accuracy rating for the caption, and in response to determining that the accuracy rating is below an accuracy threshold, prompt a user to manually review the caption prior to publishing the caption.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory devices 224 and 226 in FIG. 2) and at least one physical processor (e.g., physical processors 228 and 230 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

generating a caption for a spoken phrase in a video;

determining an accuracy rating for the caption; and in response to determining that the accuracy rating is below an accuracy threshold, prompting a user to manually review the caption prior to publishing the caption, wherein the accuracy threshold is based on a number of phrases in at least one of the video or a segment of the video corresponding to the spoken phrase, and wherein an accuracy threshold for a video or video segment that includes more than a specified number of phrases is lower than an accuracy threshold for a video or video segment that has fewer than the specified number of phrases.

2. The computer-implemented method of claim 1, further comprising identifying the spoken phrase in the video using grouping logic based on a silence interval threshold to determine a start and an end of the spoken phrase.

3. The computer-implemented method of claim 1, wherein determining the accuracy rating comprises:

generating a token-level confidence value for each word in the spoken phrase; and generating a numeric confidence value for the spoken phrase based on an average of the token-level confidence values of each word in the spoken phrase.

4. The computer-implemented method of claim 1, further comprising:

receiving user input accepting the prompt to manually review the caption;

in response to receiving the user input, providing the user with an interface that enables viewing and editing the caption;

receiving one or more edits to the caption via user input to the interface; and publishing the edited caption with the video.

5. The computer-implemented method of claim 4, wherein publishing the edited caption with the video comprises posting the video, comprising the edited caption, to a consumption channel of a social media platform.

6. The computer-implemented method of claim 1, further comprising:

generating an additional caption for an additional spoken phrase in an additional video; and determining an additional accuracy rating for the additional caption.

7. The computer-implemented method of claim 6, further comprising, in response to determining that the additional accuracy rating is above the accuracy threshold, automatically publishing the additional caption with the additional video without prompting the user to manually review the additional caption.

8. The computer-implemented method of claim 6, further comprising:

determining that the additional video includes burned-in caption; and in response to determining that the additional video includes the burned-in captions, at least one of:

providing the user with a prompt recommending that the user disable automatic captioning for the additional video;

posting the additional video without generating automatic captions for the additional video; or providing the user with a prompt recommending that the user remove the burned- in captions.

9. The computer-implemented method of claim 1, further comprising at least one of: enabling the user to select an always-review setting in which captions generated for any video provided by the user is provided to the user for manual review prior to publishing; or enabling the user to select a never-review setting in which captions generated for all videos provided by the user are published without manual review.

10. A system comprising:

at least one physical processor; and physical memory comprising computer-executable instructions that, when executed by the physical processor, cause the physical processor to:

generate a caption for a spoken phrase in a video;

determine an accuracy rating for the caption; and in response to determining that the accuracy rating is below an accuracy threshold, prompt a user to manually review the caption prior to publishing the caption, wherein the accuracy threshold is based on a number of phrases in at least one of the video or a segment of the video corresponding to the spoken phrase, and wherein an accuracy threshold for a video or video segment that includes more than a specified number of phrases is lower than an accuracy threshold for a video or video segment that has fewer than the specified number of phrases.

11. The system of claim 10, wherein the computer-executable instructions further cause the physical processor to identify the spoken phrase in the video using grouping logic based on a silence interval threshold to determine a start and an end of the spoken phrase.

12. The system of claim 10, wherein determining the accuracy rating comprises:

generating a token-level confidence value for each word in the spoken phrase; and generating a numeric confidence value for the spoken phrase based on an average of the token-level confidence values of each word in the spoken phrase.

13. The system of claim 10, wherein the computer-executable instructions further cause the physical processor to:

receive user input accepting the prompt to manually review the caption;

in response to receiving the user input, provide the user with an interface that enables viewing and editing the caption;

receive one or more edits to the caption via user input to the interface; and publish the edited caption with the video.

14. The system of claim 13, wherein publishing the edited caption with the video comprises posting the video, comprising the edited caption, to a consumption channel of a social media platform.

15. The system of claim 14, wherein the consumption channel comprises at least one of:

a short-form video channel; a newsfeed channel; or a stories channel.

16. A non-transitory computer-readable medium comprising one or more computer-readable instructions that, when executed by at least one processor of a computing device, cause the computing device to:

generate a caption for a spoken phrase in a video; determine an accuracy rating for the caption; and in response to determining that the accuracy rating is below an accuracy threshold, prompt a user to manually review the caption prior to publishing the caption, wherein the accuracy threshold is based on a number of phrases in at least one of the video or a segment of the video corresponding to the spoken phrase, and wherein an accuracy threshold for a video or video segment that includes more than a specified number of phrases is lower than an accuracy threshold for a video or video segment that has fewer than the specified number of phrases.

* * * * *